(12) United States Patent
Eatedali et al.

(10) Patent No.: US 11,934,412 B2
(45) Date of Patent: Mar. 19, 2024

(54) SYSTEMS AND METHODS FOR PROVIDING CONTEXTUAL MESSAGES FOR MEDIA CONTENTS

(71) Applicant: Disney Enterprises, Inc., Burbank, CA (US)

(72) Inventors: Josiah Eatedali, Los Angeles, CA (US); Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/584,923

(22) Filed: Jan. 26, 2022

(65) Prior Publication Data

US 2022/0147532 A1 May 12, 2022

Related U.S. Application Data

(63) Continuation of application No. 14/997,963, filed on Jan. 18, 2016, now Pat. No. 11,269,890.

(51) Int. Cl.
*G06F 16/24* (2019.01)
*G06F 16/23* (2019.01)
*G06F 16/2455* (2019.01)
*G06F 16/2457* (2019.01)
*G06F 16/44* (2019.01)

(52) U.S. Cl.
CPC .... *G06F 16/24575* (2019.01); *G06F 16/2358* (2019.01); *G06F 16/24568* (2019.01); *G06F 16/44* (2019.01)

(58) Field of Classification Search
CPC ........... G06F 16/24575; G06F 16/2358; G06F 16/24568; G06F 16/44
See application file for complete search history.

(56) References Cited

U.S. PATENT DOCUMENTS

| | | | |
|---|---|---|---|
| 9,966,112 B1* | 5/2018 | Kulkarni | H04N 21/26258 |
| 10,061,482 B1* | 8/2018 | Bingham | G11B 27/00 |
| 2010/0154007 A1* | 6/2010 | Touboul | G06Q 30/02 |
| | | | 725/115 |
| 2011/0264530 A1* | 10/2011 | Santangelo | H04L 67/53 |
| | | | 370/352 |
| 2014/0366052 A1* | 12/2014 | Ives | H04N 21/234336 |
| | | | 725/19 |
| 2016/0241929 A1* | 8/2016 | Shenkler | H04N 21/6125 |

* cited by examiner

*Primary Examiner* — Etienne P Leroux
*Assistant Examiner* — Cindy Nguyen
(74) *Attorney, Agent, or Firm* — Farjami & Farjami LLP

(57) ABSTRACT

There is provided a system including a memory and a processor configured to stream a media content for playback to a first media device for viewing by a first user, receive, while streaming the media content, an input from the first media device indicating an insertion point in the media content selected by the first user for inserting a contextual message provided by the first user, receive the contextual message from the first media device, stream the media content for playback to a second media device for viewing by a second user, and deliver the contextual message to the second media device for viewing by the second user when streaming the media content to the second media device reaches the insertion point.

20 Claims, 4 Drawing Sheets

SYSTEMS AND METHODS FOR PROVIDING CONTEXTUAL MESSAGES FOR MEDIA CONTENTS

This application is a Continuation of U.S. application Ser. No, 14/997,963, filed Jan. 18, 2016.

BACKGROUND

Increasingly, consumers are canceling cable television subscriptions and streaming entertainment over the Internet. Streaming media over the Internet has increased the ease of watching television and movies at home. Viewers eagerly awaiting the release of a movie are more likely to watch the movie at home, as soon as the movie becomes available, and less likely to watch the movie with a group of friends. Additionally, viewers who do not have access to certain shows, such as cable network television shows, are likely to watch those cable network television shows at home when the cable network television shows become available to stream. As a result, viewers who use streaming services see the shows at times that are convenient to them, which is more likely different than when other family members or friends stream the same shows.

SUMMARY

The present disclosure is directed to systems and methods for providing contextual messages for media contents, substantially as shown in and/or described in connection with at least one of the figures, as set forth more completely in the claims.

DETAILED DESCRIPTION

Figure 1:
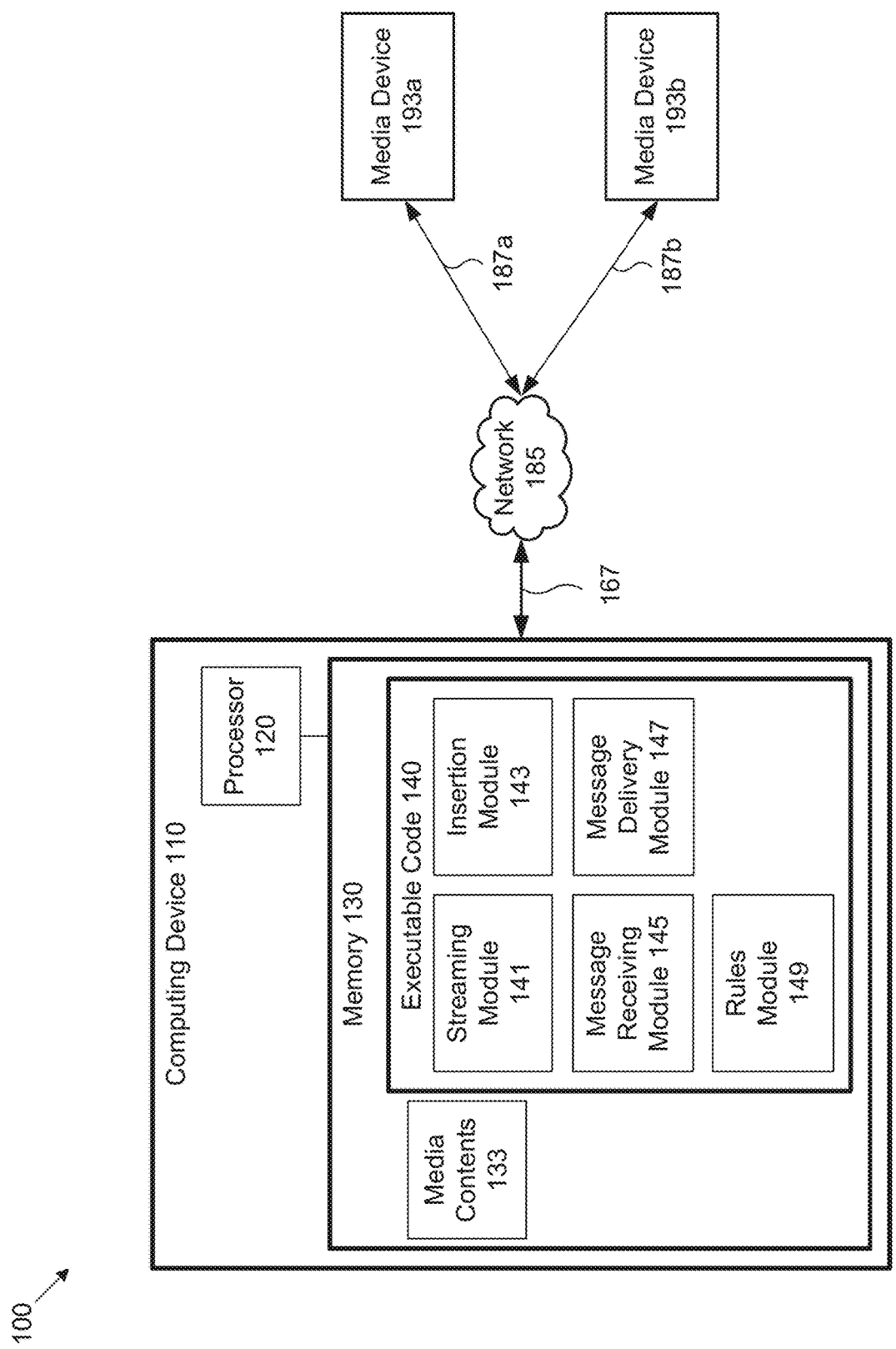
FIG. 1 shows a diagram of an exemplary system for providing contextual messages for media contents, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for providing contextual messages for media contents, according to one implementation of the present disclosure, according to one implementation of the present disclosure. Diagram 100 includes computing device 110, network 185, and media devices 193a and 193b. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes media content 133 and executable code 140.

In some implementations, computing device 110 may be a media server providing media contents 133 to media devices 193a and 193b. In other implementations, computing device 110 may be a third party server that receives media contents 133 and streams one or more of media contents 133 to media devices 193a and 193b. Media contents 133 may include video media contents, such as television (TV) shows, movies, or other media contents being streamed over the Internet. In other implementations, media contents 133 may include audio content, such as an audio book, digital written content, such as an electronic book, and/or interactive content. Computing device 110 may provide media contents 133 to media devices 193a and 193b via connections 167 and 187a and 187b, respectively.

Executable code 140 includes one or more software modules stored in memory 130 for execution by processor 120 of communication device 110 to receive a contextual message from media device 193a while streaming media content 133 to media device 193a, and deliver the contextual message to media device 193b while subsequently streaming media content 133 to media device 193b. Executable code 140 may operate with an existing content distribution service, such as a subscription or ad-supported video streaming service, e.g., Netflix, Amazon Prime, Hulu, etc., a content aggregation service, e.g., Disney Movies Anywhere, etc., or a transactional service, e.g., iTunes, Amazon Instant Video, etc. In some implementations, executable code 140 may allow and/or require a user to create an account and log in before streaming media contents 133. The account may be linked to one or more social media accounts, and executable code 140 may be able to connect to the one or more social media accounts for identity verification, account verification, and/or various settings, such as privacy settings, e.g., the user account will only accept contextual messages from accounts of friends on the connected social media platforms. As shown in FIG. 1, executable code 140 includes streaming module 141, insertion module 143, contextual message module 145, and rules module 149.

Streaming module 141 is a software module stored in memory 130 for execution by processor 120 to stream media contents 133. In some implementations, streaming module 141 may receive media contents 133 from a media server (not shown), or streaming module 141 may retrieve media contents 133 from memory 130. Streaming module 141 may stream media contents 133 over connection 167 to network 185 and connections 187a and 187b to the corresponding media device 193a and media device 193b. To enable accurate creation and insertion of contextual messages, streaming module 141 may provide a time code for media content 133 to insertion module 143 and message module 145.

Insertion module 143 is a software module stored in memory 130 for execution by processor 120. Insertion module 143 may receive an input from media device 193a indicating an insertion point in media content 133. The insertion point may be a specific time in the time code of media content 133, a specific frame in media content 133, a specific scene in media content 133, a specific shot in media content 133, etc., at which something happens prompting a response by a user viewing media content 133. In some implementations, insertion module 143 may create an insertion point and associate the insertion point with a specific time in the time code or a specific frame number or scene number in media content 133. In some implementations, insertion module 143 may store the insertion point in memory 130. During a subsequent playback of media content 133, insertion module 143 may send a signal to media device 193*b* including the insertion point so that media device 193*b* may present the contextual message associated with the insertion point to a user viewing media content 133 on media device 193*b* in response to playback on media device 193*b* reaching the insertion point in media content 133. In other implementations, the insertion point may be a specific position in a digital audio content, such as a position in an audio book, or a location in a digital written content, such as a page and line number associated with a position in a digital book, or the insertion point may be associated with an action in an interactive content.

Message receiving module 145 is a software module stored in memory 130 for execution by processor 120 to receive a contextual message from media device 193*a* during playback of media content 133. For example, the user of media device 193*a* may have a remark to make in reaction to a scene of media content 133 that will be understood in the context of media content 133. The user may type a contextual message to send as a text contextual message, audibly speak a contextual message to send as an audio contextual message, record a video to send as a video contextual message, etc. In some implementations, contextual message module 145 may receive a contextual message recorded by a user of media device 193*a*, and may store the contextual message in memory 130.

Message delivery module 147 is a software module stored in memory 130 for execution by processor 120 to deliver a contextual message to media device 193*b* for display prior to playback of media content 133, during playback of media content 133, and/or after playback of media content 133. In some implementations, message delivery module 147 may send a contextual message to media device 193*b* for display when media device 193*b* reaches the associated insertion point during the playback of media content 133. The contextual message may be a text contextual message, an audio contextual message, a picture contextual message, a video contextual message, etc. In some implementations, message delivery module 147 may send a notification message to a user account associated with media device 193*b*. The notification message may alert the user of media device 193*b* of the pending contextual message, and may include information, such as an identification of the user sending the contextual message, which media content the contextual message is associated with, etc. In some implementations, message delivery module 147 may send the notification message for display on media device 193*b*, as an SMS message, as an email, etc.

Rules module 149 is a software module stored in memory 130 for execution by processor 120. Rules module 149 may allow a user who is sending a contextual message to define one or more rules that may apply to display and/or playback of the contextual message. In some implementations, rules in rules module 149 may be determined by a content provider, or rules module 149 may allow a user to define one or more rules related to the contextual message, or select one or more rules from a predefined list of rules. Rules related to the contextual message may include rules governing when the message may be transmitted and/or displayed, such as the receiving user must watch a certain portion of media content 133, e.g., up to the insertion point, the first half of media content 133, all of media content 133, etc., before viewing the contextual message. In other implementations, the user of device 193*b* may receive a notification that a contextual message have been sent, but the user will not be able to view the contextual message until a transaction for media content 133 is completed, e.g., purchasing media content 133, renting media content 133, etc.

Network 185 is a computer network connecting computing device 110 to media devices 193*a* and 193*b* via connection 167 and respective connections 187*a* and 187*b*. In some implementations, network 185 may be the Internet. Media device 193*a* and media device 193*b* may display media contents 133 and record contextual messages, transmit the contextual message to computing device 110, receiving a recorded contextual message from computing device 110, and subsequently delivering the contextual message to a user of media device 193*a* or 193*b*. In some implementations, media device 193 may be a computer, a tablet computer, a smart phone, a digital video recorder, a set top box, a smart TV, an internet connectable media device such as a blu-ray player, etc.

Figure 2:
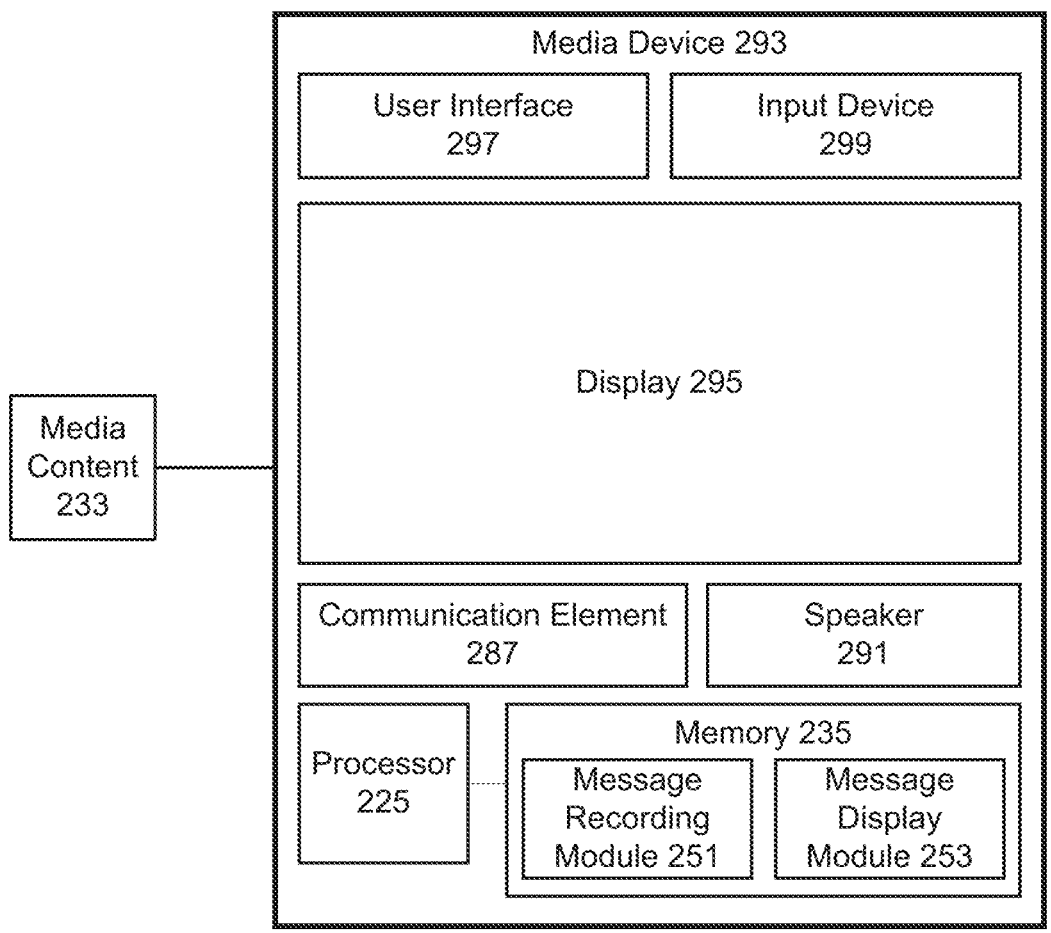
FIG. 2 shows a diagram of an exemplary media device for use with the system of FIG. 1, according to one implementation of the present disclosure.

FIG. 2 shows a diagram of an exemplary media device for use with the system of FIG. 1, according to one implementation of the present disclosure. Diagram 200 includes media content 233 and media device 293, which correspond to media content 133, and media devices 193*a* and 193*b*, respectively. Media device 293 includes processor 225, memory 235, communication element 287, speaker 291, display 295, user interface 297, and input device 299. Processor 225 is a hardware processor, such as a central processing unit (CPU) used in computing devices. Memory 235 is a non-transitory storage device for storing software for execution by processor 225, and also storing various data and parameters. Memory 235 includes message recording module 251 and message display module 253.

Message recording module 251 is a software module stored in memory 235 for execution by processor 225 to record a contextual message. In some implementations, media device 293 may receive an input from a user indicating an insertion point in media content 233, and message recording module 251 may transmit the insertion point to computing device 110 via communication element 287. Message recording module 251 may pause the playback of media content 233 on media device 293 to enable the user to record a contextual message without missing any of media content 233, or message recording module 251 may record the user's contextual message while media content 233 continues to play. The contextual message may include a typed message to be displayed as text, an audio message, a photographic message, an animated message, a video message, a multimedia message including video and audio, etc. Media device 293, using recorded message module 235, may be configured to record the contextual message and send the contextual message, using communication element 287, to computing device 110.

Message display module 253 is a software module stored in memory 235 for execution by processor 225 to display a contextual message during playback of media content 233. In some implementations, message display module 253 may receive a contextual message from computing device 110. Message display module 253 may display an icon or a message on display 295, such as an icon of an unopened envelope or a numeral indicating the number of received contextual messages, or message display module 253 may play a sound using speaker 291, to indicate the receipt of the contextual message. Message display module 253 may display the contextual message on display 295 for viewing by a user of media device 293. Message display module 253 may also receive insertion point from computing device 110 indicating a point during playback of media content 233 at which to deliver a contextual message to media device 193b. The insertion point may be a time in the time code of media content 133, a scene in media content 133, a frame in media content 133, etc. Message display module 253 may display the contextual message in response to reaching the insertion point in media content 133. In some implementations, message display module 253 may display the contextual message during the playback of media content 133, or at the end of media content 133. In some implementations, message display module 253 may allow a user to choose whether to play contextual messages during the playback of media content 233, or delay the playback of any contextual messages until the end of media content 233, enabling the user to experience media content 233 uninterrupted.

In some implementations, media device 293 may include communication element 287 and may be connectable through wired connection or wireless connection with other devices, for example, computing device 110. In some implementations, communication element 287 may be configured to receive a communication cable such as a universal serial bus (USB) port, Firewire port, Ethernet cable port, telephone cable port, HDMI port. In some implementations, communications element 287 can be configured to receive a transferable memory device, such as an SD card, mini SD card, micro SD card, USB memory device, a memory stick, or other configurations of transferable memory known in the art. In some implementations, communication element 287 may enable wireless communications, such that media device 293 may be wirelessly connected to a computer or a computer network, such as network 185, using WiFi, cellular, Bluetooth®, or other wireless technologies known in the art. Communication element 287 may be used to receive and deliver contextual messages during playback of media content 133.

Speaker 291 may be a speaker or a plurality of speakers suitable for playing an audio portion of media content 233 and/or an audio contextual message or audio portion of a multimedia contextual message related to media content 233. Media device 293 may also include display 295 for displaying media content 233 and/or a contextual message related to media content 233. In some implementations, display 295 may be a display such as a computer monitor, a television display, the display of a smart phone, the display of a tablet computer, etc. User interface 297 may be an input device suitable for receiving user input and may include a computer keyboard, a computer mouse, a touch screen, etc. In some implementations, user interface 297 may be a microphone and may record an audio contextual message or an audio portion of a multimedia contextual message. Input device 299 may be a device suitable for receiving a user input and may include a microphone, a camera, or other input device suitable for recording an audio, video, or multimedia contextual message. In some implementations, input device 299 may be a digital camera and may include a camera for taking photographs and/or video content.

Figure 3:
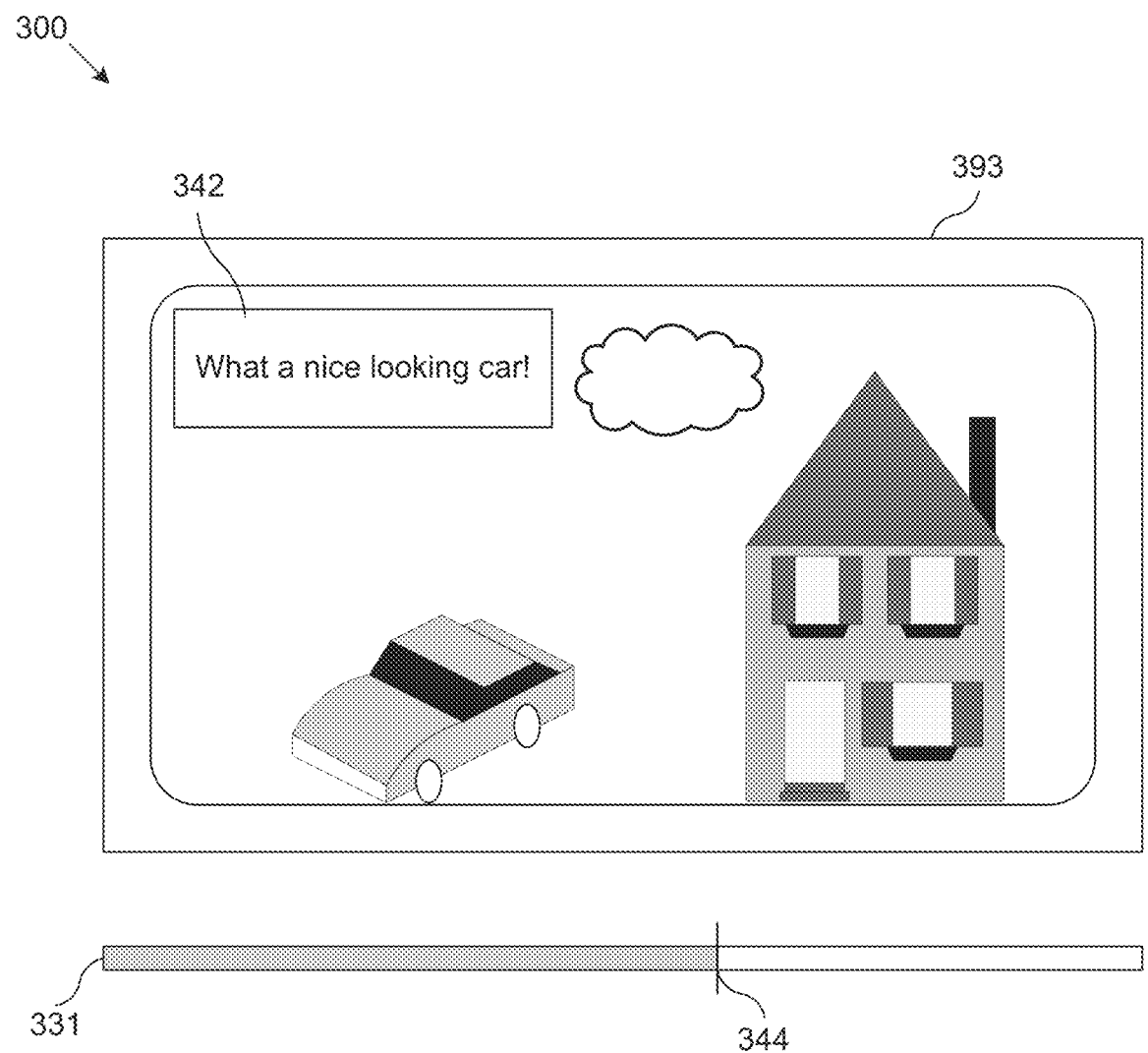
FIG. 3 shows a diagram of an exemplary media content including a displayed contextual message, according to one implementation of the present disclosure.

FIG. 3 shows a diagram of an exemplary media content including a displayed contextual message 342, according to one implementation of the present disclosure. Diagram 300 shows media device 393 and timeline 331 corresponding to media content 133. Media device 393 shows a scene from media content 133 depicting a car outside a building under a cloud in the sky. Contextual message 342 displays a contextual message created by the first user as it is displayed by media device 393 during the playback of media content 133 to a second user. Insertion point 344 indicates the point in timeline 331 at which the first user created an insertion point while watching media content 133. When media device 393 reaches insertion point 344 during the playback of media content 133, media device 393 may deliver contextual message 342 to a second user viewing media content 133. As shown in diagram 300, contextual message 342 displays contextual message 342 in which the first user communicates her opinion about the car in media content 133. Contextual message 342 may include text, audio, a picture, a video, or any combination of text, audio, pictures, and video.

As a user is viewing media content 133 on media device 393, the user may have a reaction to media content 133. For example, as shown in FIG. 3, the user may see a car on the screen and may think the car looks nice. The user may want to share this reaction with another user and may operate user interface 297 to create insertion point 344, and the user may record contextual message 342. As shown in FIG. 3, contextual message 342 is a text contextual message displayed in a picture-in-picture window on media device 393. In other implementations, contextual message 342 may be a picture contextual message, an audio contextual message, a video contextual message, or a multimedia contextual message. When a user viewing media content 133 on media device 393 reaches insertion point 344 in media content 133, contextual message 342 may be displayed on display 295, played using speaker 291, etc. In some implementations, the user viewing media content 133 may elect to view contextual message 342 at insertion point 344, or the viewing user may elect to view contextual message 342 when playback of media content 133 reaches the end of timeline 331 or some other time during media content 133.

Figure 4:
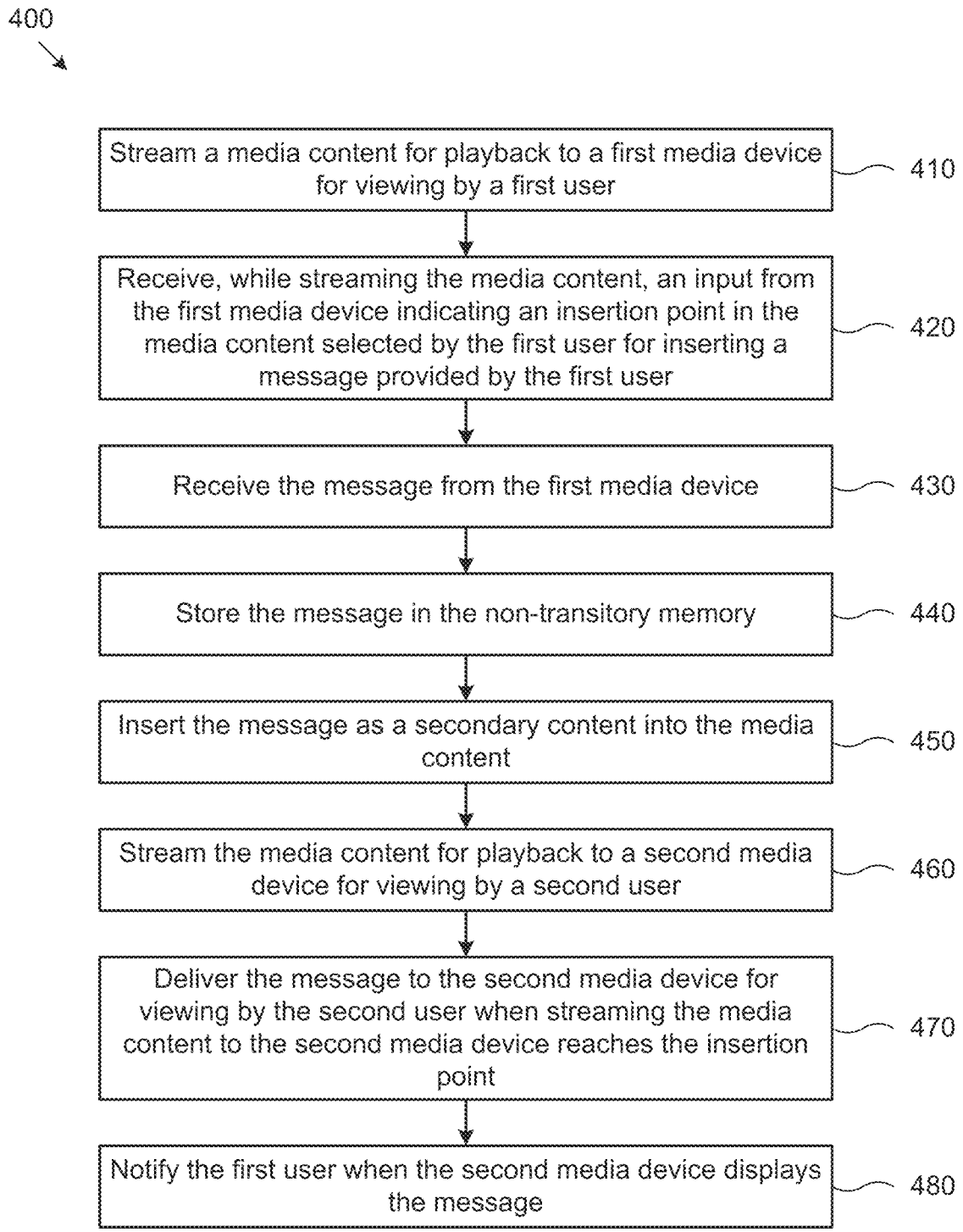
FIG. 4 shows a flowchart illustrating an exemplary method of providing a contextual message, according to one implementation of the present disclosure.

FIG. 4 shows a flowchart illustrating an exemplary method of providing a contextual message, according to one implementation of the present disclosure. Flowchart 400 begins at 410, where executable code 140, using processor 120, streams media content 133 for playback to media device 193a for viewing by a first user. Executable code 140 may run on a media server that provides media content, such as in connection with a subscription or ad-supported video streaming service, e.g., Netflix, Amazon Prime, Hulu, etc., a content aggregation service, e.g., Disney Movies Anywhere, etc., or a transactional service, e.g., iTunes, Amazon Instant Video, etc. Alternatively, executable code 140 may run on a third-party server or computing device that is connected to a media server through network 185. In some implementations, executable code 140 may aggregate media contents from one or more video streaming services, content aggregation services, and/or transactional services.

At 420, executable code 140 receives, while streaming media content 133, an input from media device 193a indicating an insertion point in media content 133 selected by the first user for inserting a contextual message provided by the first user. In some implementations, the first user may indicate the insertion point in media content 133 using user interface 297. In some implementations, the first user may select a second user to whom the contextual message will be sent. The second user may be selected from a contact list, such as an email contact list or a social media friend list, or the second user may be selected by entering identifying information, such as an email address or mobile phone number of the second user.

At 430, executable code 140, using message receiving module 145, receives the contextual message from media device 193a. In some implementations, media device 193a transmits the contextual message over network 185, e.g., the Internet. The contextual message may include a written contextual message, a graphic contextual message, such as a photograph, a video contextual message, and/or a multimedia contextual message which may include any combination of a text contextual message, a graphic contextual message, a picture contextual message, and audio contextual message, and a video contextual message. In some implementations, the first user may create the contextual message using media device 193*a*. For example, the first user may type the contextual message as a text message using user interface 297, or the first user may record a video contextual message using input device 299 and may include an audio contextual message, either individually or as an audio component of a video contextual message, using user interface 297. Additionally, executable code 140, using rules module 149, may apply one or more rules to be met prior to the playback of the contextual message. In some implementations, a content owner or media service may define one or more rules related to the contextual message, or the user sending the contextual message may define one or more related to the contextual message.

At 440, executable code 140 may optionally store the contextual message in memory 130. Message receiving module 145 may receive the contextual message from media device 193*a* and store the contextual message to provide the contextual message to media device 193*b* at some time in the future. In some implementations, executable code 140 may include a time limitation for storing the contextual message, e.g., executable code 140 may store the contextual message for one day, one week, etc. Executable code 140 may stream the contextual message stored in memory 130 to media device 193*b* when the second user reaches the insertion point in media content 133.

At 450, executable code 140. using message delivery module 147, may optionally insert the contextual message as secondary content into media content 133. In some implementations, executable code 140 may stream the contextual message to media device 193*b* as a secondary content. Method 400 continues at 460, where executable code 140 streams media content 133 for playback to media device 193*b* for viewing by a second user. In some implementations, executable code 140 may receive media content 133 from a media server, such as a server for a subscription video streaming service, or executable code 140 may retrieve media content 133 from memory 130. Executable code 140 may stream media content 133 to media device 193*b* to be viewed by the second user. Executable code 140 may track the progress of the second user in media content 133 as the second user views media content 133, such as by monitoring the time code of media content 133 during playback.

At 470, executable code 140, using message delivery module 147, delivers the contextual message to media device 193*b* for viewing by the second user when streaming media content 133 to media device 193*b* reaches the insertion point during the playback of media content 133. In some implementations, rules module 149 may delay the delivery of the contextual message until one or more rules, such as purchasing or renting media content 133 and/or reaching the insertion point in media content 133. have been satisfied. The contextual message may be displayed on media device 193*b* as a pop-up message, a picture-in-picture message, or other suitable display, and/or using speaker 291. In some implementations, executable code 140 may deliver the contextual message during the playback of media content 133. In some implementations, executable code 140 may pause the playback of media content 133 to deliver the contextual message, or executable code 140 may deliver the contextual message after media content 133 has ended, for example, before the credits of media content 133 begin.

At 480, executable code 140 may optionally notify the first user when media device 193*b* displays the contextual message. When the second user views the contextual message on media device 193*b*, executable code 140 may send a message, such as an email, SMS text message, a message on social media, etc., to the first user notifying the first user that the second user has viewed the contextual message. In some implementations, the notification may include a response message sent from the second user to the first user responding to the contextual message and/or media content 133. The notification may allow the first user to contact the second user to discuss media content 133, and may prevent the first user from spoiling media content 133 for the second user by ensuring the first user does not disclose important information before the second user reaches the insertion point in media content 133.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code; and
a hardware processor configured to execute the executable code to:
receive a request from a first user to stream a media content to a media device for viewing by the first user, the media content including a contextual message received from a second user and associated with an insertion point in the media content;
stream, in response to the request, the media content to the media device for viewing by the first user;
pause streaming the media content to the media device when streaming the media content reaches the insertion point of the contextual message; and
deliver, while streaming of the media content to the media device is paused at the insertion point, the contextual message for display on the media device at the insertion point.

2. The system of claim 1, wherein prior to delivering the contextual message, the hardware processor is further configured to execute the executable code to:
store the contextual message in the non-transitory memory.

3. The system of claim 1, wherein the contextual message is configured to be displayed on the media device in a pop-up window or a picture-in-picture window.

4. The system of claim 1, wherein the hardware processor is further configured to execute the executable code to:
resume streaming the media content to the media device after delivering the contextual message for display on the media device at the insertion point.

5. The system of claim 1, wherein the insertion point is within or at an end of the media content.

6. The system of claim 1, wherein the contextual message includes at least one of a text contextual message, an audio contextual message, or a video contextual message.

7. The system of claim 1, wherein prior to streaming the media content to the media device, the hardware processor is further configured to execute the executable code to:
insert the contextual message as a secondary content into the media content at the insertion point.

8. The system of claim 1, wherein the hardware processor is further configured to execute the executable code to:
receive, while streaming the media content to the media device, an input from the first user via the media device, the input selecting the second user for delivery of another contextual message to the second user.

9. The system of claim 1, wherein hardware processor is further configured to execute the executable code to:
upon delivering the contextual message for display on the media device at the insertion point, send a notification to the second user, using at least one of an SMS message, an e-mail or a social media message, that the contextual message has been delivered to the first user.

10. The system of claim 1, wherein hardware processor is further configured to execute the executable code to:
prior to receiving the request from the first user to stream the media content to the media device for viewing by the first user, send a notification to the first user, using at least one of an SMS message, an e-mail or a social media message, that the contextual message has been included in the media content for delivery to the first user.

11. A method for use with a system including a hardware processor and a non-transitory memory, the method comprising:
receiving, using the hardware processor, a request from a first user to stream a media content to a media device for viewing by the first user, the media content including a contextual message received from a second user and associated with an insertion point in the media content;
streaming, using the hardware processor and in response to the request, the media content to the media device for viewing by the first user;
pausing, using the hardware processor, streaming the media content to the media device when streaming the media content reaches the insertion point of the contextual message; and
delivering, using the hardware processor, while streaming of the media content to the media device is paused at the insertion point, the contextual message for display on the media device at the insertion point.

12. The method of claim 11, wherein the contextual message is configured to be displayed on the media device is displayed in a pop-up window or a picture-in-picture window.

13. The method of claim 11, further comprising:
resuming, using the hardware processor, streaming the media content to the media device after delivering the contextual message for display on the media device at the insertion point.

14. The method of claim 11, wherein the insertion point is within or at an end of the media content.

15. The method of claim 11, wherein the contextual message includes at least one of a text contextual message, an audio contextual message, or a video contextual message.

16. The method of claim 11, wherein prior to delivering the contextual message to the second media device, the method further comprises:
inserting the contextual message as a secondary content, at the insertion point, into the media content at the insertion point.

17. The method of claim 11, further comprising:
receiving, using the hardware processor and while streaming the media content to the media device, an input from the first user via the media device, the input selecting the second user for delivery of another contextual message to the second user.

18. The method of claim 11, further comprising:
upon delivering the contextual message to the first user, sending, using the hardware processor, a notification to the second user, using at least one of an SMS message, an e-mail or a social media message, that the contextual message has been delivered to the first user.

19. The method of claim 11, further comprising:
prior to receiving the request from the first user to stream the media content to the media device for viewing by the first user, sending a notification to the first user, using at least one of an SMS message, an e-mail or a social media message, that the contextual message has been included in the media content for delivery to the first user.

20. A system comprising:
a non-transitory memory storing an executable code; and
a hardware processor configured to execute the executable code to:
send a notification to a first user, using at least one of an SMS message, an e-mail or a social media message, that a contextual message has been included in a video content for streaming to the first user;
after sending the notification to the first user, receive a request from the first user to stream the video content to a media device for viewing by the first user, the video content including the contextual message received from a second user and associated with an insertion point in the video content;
present the first user with a first choice and a second choice, wherein the first choice is to display the contextual message at the insertion point, wherein the second choice is to display the contextual message at an end of the video content;
receive an election from the first user of one of the first choice or the second choice;
stream, in response to the request, the video content to the media device for viewing by the first user;
deliver, based on the election, the contextual message for display on the media device at the insertion point or at the end of the video content; and
upon delivering the contextual message for display on the media device at the insertion point or at the end of the video content, send a notification to the second user, using at least one of the SMS message, the e-mail or the social media message, that the contextual message has been delivered to the first user.

* * * * *